(12) United States Patent
Tomlin et al.

(10) Patent No.: US 10,087,898 B2
(45) Date of Patent: *Oct. 2, 2018

(54) AIR FILTER ELEMENT ASSEMBLY FOR A MOTOR VEHICLE

(71) Applicant: FORD GLOBAL TECHNOLOGIES, LLC, Dearborn, MI (US)

(72) Inventors: Jacqueline L. Tomlin, Southfield, MI (US); Roger Joseph Khami, Troy, MI (US); Alexander Adam King, Goodrich, MI (US); Jeff Sean Boulton, Monroe, MI (US); John Emley, Canton, MI (US); Joseph Matthew McCann, Plymouth, MI (US); Hovie Jarrett Cassell, Piedmont, SC (US)

(73) Assignee: Ford Global Technologies LLC, Dearborn, MI (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/698,149

(22) Filed: Apr. 28, 2015

(65) Prior Publication Data

US 2016/0090947 A1    Mar. 31, 2016

Related U.S. Application Data

(63) Continuation-in-part of application No. 14/498,507, filed on Sep. 26, 2014.

(51) Int. Cl.
*F02M 35/02* (2006.01)
*F02M 35/024* (2006.01)
(Continued)

(52) U.S. Cl.
CPC ....... *F02M 35/0245* (2013.01); *B01D 46/002* (2013.01); *B01D 46/0002* (2013.01);
(Continued)

(58) Field of Classification Search
CPC ............... B01D 46/521; F02M 35/024; F02M 35/0215; F02M 35/02416; F02M 35/08; F01M 35/04
(Continued)

(56) References Cited

U.S. PATENT DOCUMENTS 4,861,359 A     8/1989  Tettman
5,251,712 A    10/1993  Hayashi et al.
(Continued)

FOREIGN PATENT DOCUMENTS

DE         10053145 A1    5/2002
DE    102011117638 A1    5/2013
(Continued)

OTHER PUBLICATIONS

English Machine Translation of DE10053145A1.
(Continued)

*Primary Examiner* — Duane Smith
*Assistant Examiner* — Minh-Chau Pham
(74) *Attorney, Agent, or Firm* — Vichit Chea; King & Schickli PLLC

(57) ABSTRACT

A filter element assembly includes a filter body and an auxiliary filter. The filter body includes a sidewall around a hollow core. Further the filter body and auxiliary filter are both received and held on a support including a base and a cage.

18 Claims, 9 Drawing Sheets

(51) Int. Cl.
*B01D 46/00* (2006.01)
*B01D 46/52* (2006.01)
*F02M 35/08* (2006.01)

(52) U.S. Cl.
CPC ....... *B01D 46/0095* (2013.01); *B01D 46/521* (2013.01); *F02M 35/0215* (2013.01); *F02M 35/02416* (2013.01); *F02M 35/02483* (2013.01); *F02M 35/082* (2013.01); *F02M 35/088* (2013.01); *B01D 2273/10* (2013.01); *B01D 2275/208* (2013.01)

(58) Field of Classification Search
USPC ...... 55/484, 309, 310, 385.3, 419, 502, 503, 55/DIG. 31; 123/198 E
See application file for complete search history.

(56) References Cited

U.S. PATENT DOCUMENTS

| | | | |
|---|---|---|---|
| 5,350,444 A | 9/1994 | Gould et al. | |
| 5,391,212 A | 2/1995 | Ernst et al. | |
| 5,556,441 A | 9/1996 | Courtwright et al. | |
| 6,007,595 A | 12/1999 | Baik et al. | |
| 6,312,489 B1 | 11/2001 | Ernest et al. | |
| 6,425,930 B1 | 7/2002 | Wake et al. | |
| 6,451,079 B1 | 9/2002 | Lange et al. | |
| 6,644,797 B2* | 11/2003 | Haines | B41J 2/17563 347/93 |
| 7,393,372 B2 | 7/2008 | Cassell et al. | |
| 7,442,221 B2 | 10/2008 | Ruhland et al. | |
| 7,556,663 B2 | 7/2009 | Niakan | |
| 7,637,976 B2 | 12/2009 | Dirnberger et al. | |
| 7,648,546 B2 | 1/2010 | Haberkamp et al. | |
| 7,879,125 B2 | 2/2011 | Haberkamp et al. | |
| 8,211,197 B2 | 7/2012 | Srinivasan et al. | |
| 8,241,382 B2* | 8/2012 | Pham | F02M 35/024 123/198 E |
| 2003/0217534 A1 | 11/2003 | Krisko et al. | |
| 2005/0060969 A1* | 3/2005 | Volkmann | B01D 46/0023 55/315 |
| 2011/0023427 A1 | 2/2011 | Srinivasan et al. | |
| 2011/0232242 A1 | 9/2011 | Champion et al. | |
| 2012/0132573 A1* | 5/2012 | Lautzenheiser | C02F 1/008 210/85 |
| 2012/0204846 A1 | 8/2012 | Schultz | |
| 2013/0298773 A1* | 11/2013 | Yamagishi | B01D 46/10 96/15 |
| 2015/0345807 A1 | 12/2015 | Capellmann et al. | |
| 2016/0090946 A1 | 3/2016 | Tomlin et al. | |
| 2016/0090947 A1 | 3/2016 | Tomlin et al. | |

FOREIGN PATENT DOCUMENTS

DE 102013224878 A1 * 6/2014 ............. F02M 35/08
EP 2366885 A2 9/2011

OTHER PUBLICATIONS

English Machine Translation of DE102011117638A1.
Search Report for British application No. GB1321933.2 dated Jun. 12, 2014.
Office Action dated May 25, 2016 regarding U.S. Appl. No. 14/556,363, filed Dec. 1, 2014.
Office Action dated Oct. 18, 2016 regarding U.S. Appl. No. 14/556,363, filed Dec. 1, 2014.

* cited by examiner

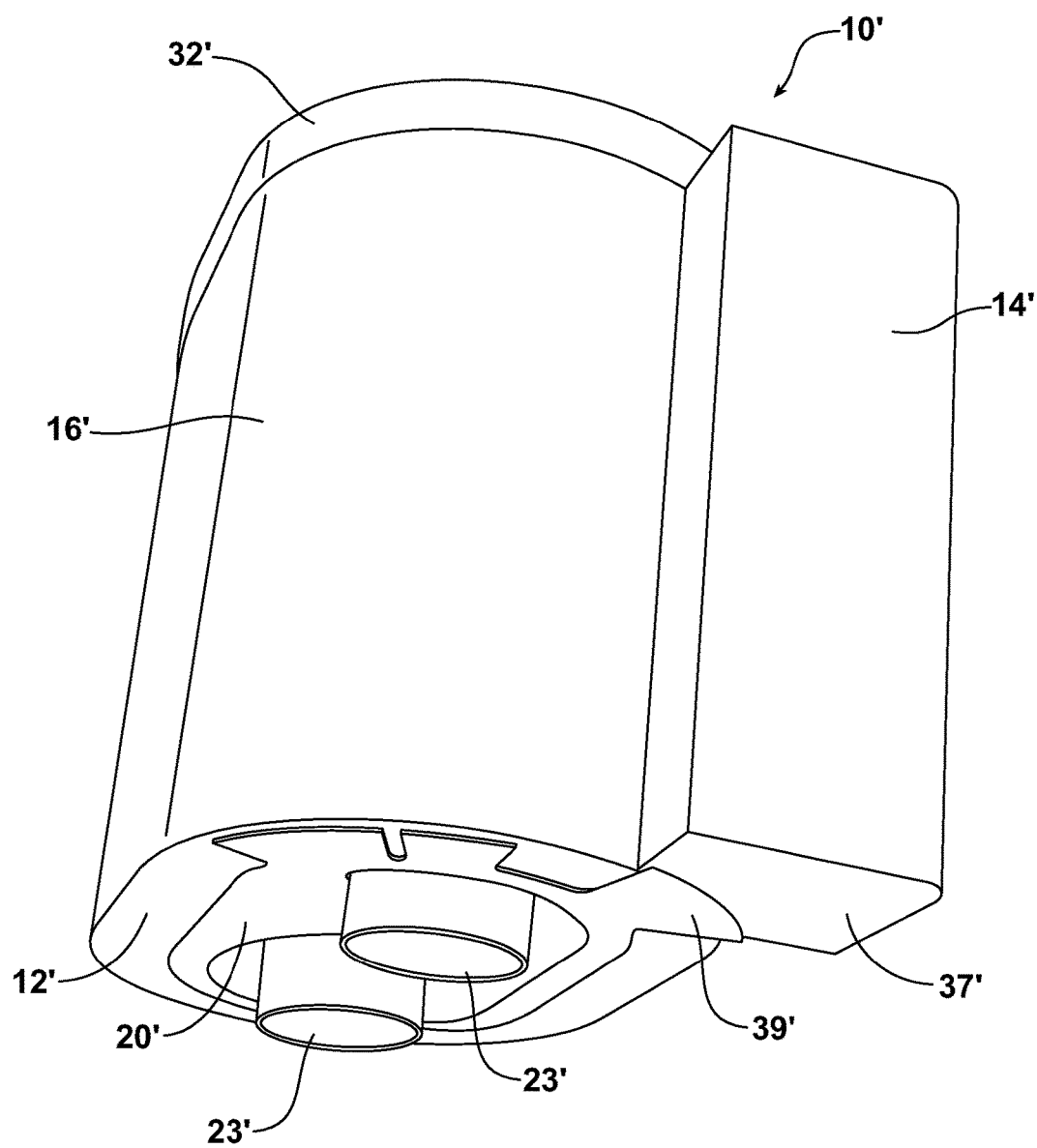

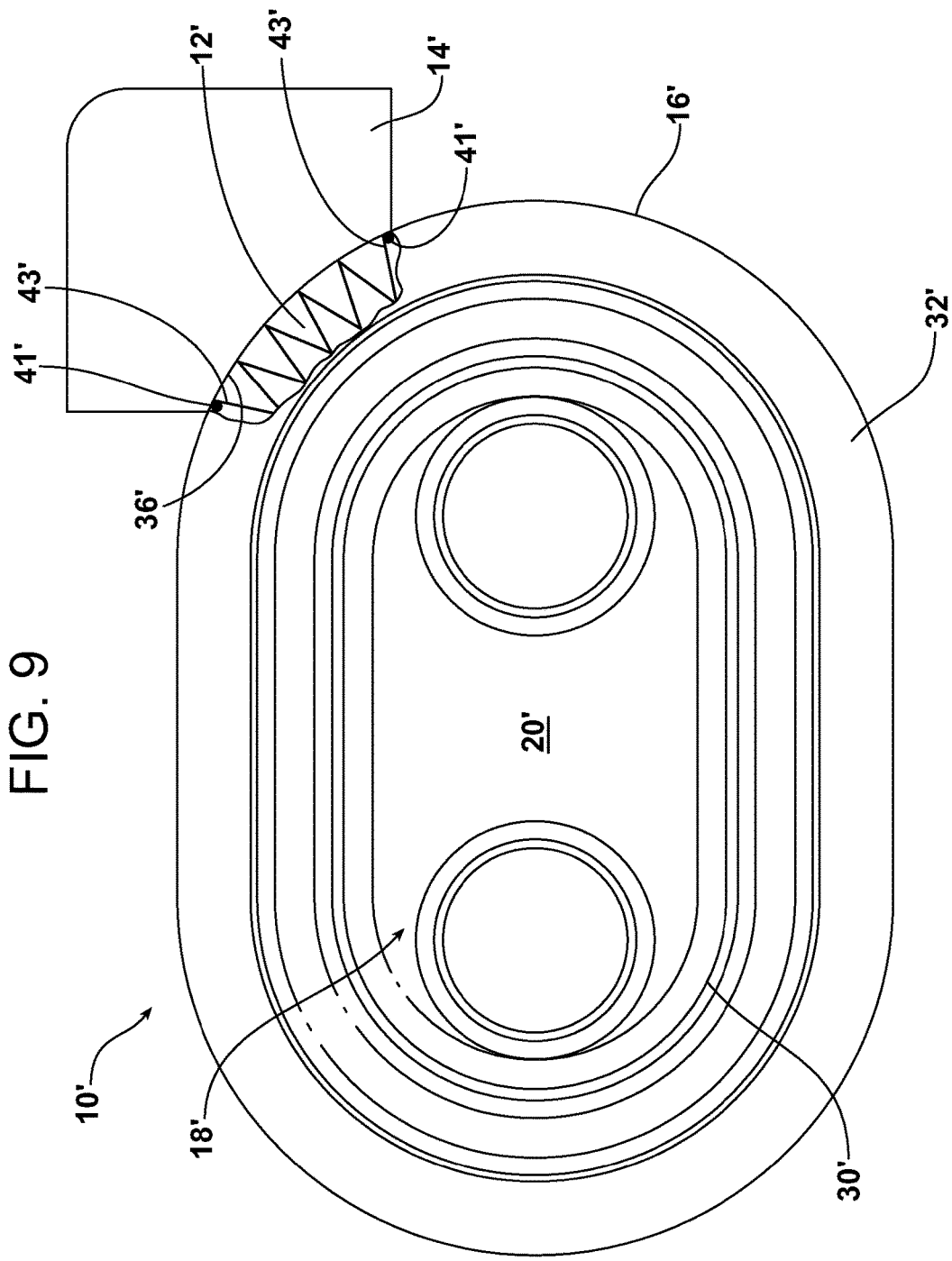

AIR FILTER ELEMENT ASSEMBLY FOR A MOTOR VEHICLE

This application is a continuation-in-part (CIP) of U.S. patent application Ser. No. 14/498,507, filed on 26 Sep. 2014, the full disclosure of which is incorporated herein by reference.

TECHNICAL FIELD

This document relates generally to the motor vehicle equipment field and, more particularly, to a filter element assembly incorporating a primary filter and an auxiliary filter.

BACKGROUND

An internal combustion engine of a vehicle requires an adequate supply of filtered, fresh air to function properly. Accordingly, air from the atmosphere may be drawn through a particle filter to remove dust and other particulates before the air enters the air intake of the engine. For vehicles operating in temperate climates, a single particle filter may provide many months of adequate air filtration before the filter becomes clogged and a replacement is needed. During severe weather conditions, however, the filter may clog prematurely with ice and snow, thereby restricting air flow into the engine and degrading engine performance. Such severe weather conditions may include, for example, very snowy conditions and/or snow plowing conditions.

One solution to this problem is to install a specialized grille cover on the vehicle to prevent entry of snow and/or dust into an air filtration system of the vehicle. However, such grille covers are matched specifically to the front-end configuration of the vehicle on which it is installed and may, therefore, be expensive to produce. Furthermore, the vehicle operator may have to install and remove the grille cover repeatedly in response to changing weather conditions, causing dissatisfaction.

It is known to provide air filtration systems adapted to supply sufficient clean air to the intake of the engine when the air filtration system becomes clogged or blocked. Such air filtration systems may comprise a housing that is configured to partition a filter into a main portion and an auxiliary portion, wherein an auxiliary air inlet may be configured to direct air to the auxiliary portion of the filter upon the main portion of the filter becoming blocked.

However, air filtration systems adapted for operation in severe weather conditions may be more expensive and more difficult to service than a standard air filtration system configured for use in cold temperate climates. The present invention seeks to address these issues.

SUMMARY

In accordance with the purposes and benefits described herein, a filter element assembly is provided for a motor vehicle. That filter element assembly comprises a support, a filter body carried on the support and an auxiliary filter carried on the support against the sidewall of the filter body. The sidewall of the filter body extends around a hollow core. In one possible embodiment the filter body forms an elliptic cylinder. In one possible embodiment the filter body is a pleat-pack filter.

In one possible embodiment, the auxiliary filter is an open cell foam. In one possible embodiment, the auxiliary filter is carried on the support outside of the core. In one possible embodiment, the filter body has a first longitudinal axis and the auxiliary filter has a second longitudinal axis wherein the first longitudinal axis is parallel to and offset from the second longitudinal axis. In one possible embodiment the filter element assembly further includes a sealing ring on the filter body around the axial outlet.

In one possible embodiment, an adhesive secures the auxiliary filter to the support. In one possible embodiment an adhesive secures the auxiliary filter directly to the sidewall of the filter body. In one possible embodiment, that adhesive is provided only on peaks of the two outermost pleats which engage the auxiliary filter in order to secure the auxiliary filter in place.

In the following description, there are shown and described several preferred embodiments of the filter element assembly. As it should be realized, the filter element assembly is capable of other, different embodiments and its several details are capable of modification in various, obvious aspects all without departing from the assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the filter element assembly and together with the description serve to explain certain principles thereof. In the drawing:

FIG. 8 is a bottom perspective view of yet another embodiment of the filter element assembly wherein the auxiliary filter is connected directly to the filter body.

FIG. 9 is a partially cut away top plan view showing the adhesive attaching the auxiliary filter directly to the pleats of the filter body.

Reference will now be made in detail to the present preferred embodiments of the filter element assembly, examples of which are illustrated in the accompanying drawing figures.

DETAILED DESCRIPTION

Figure 1:
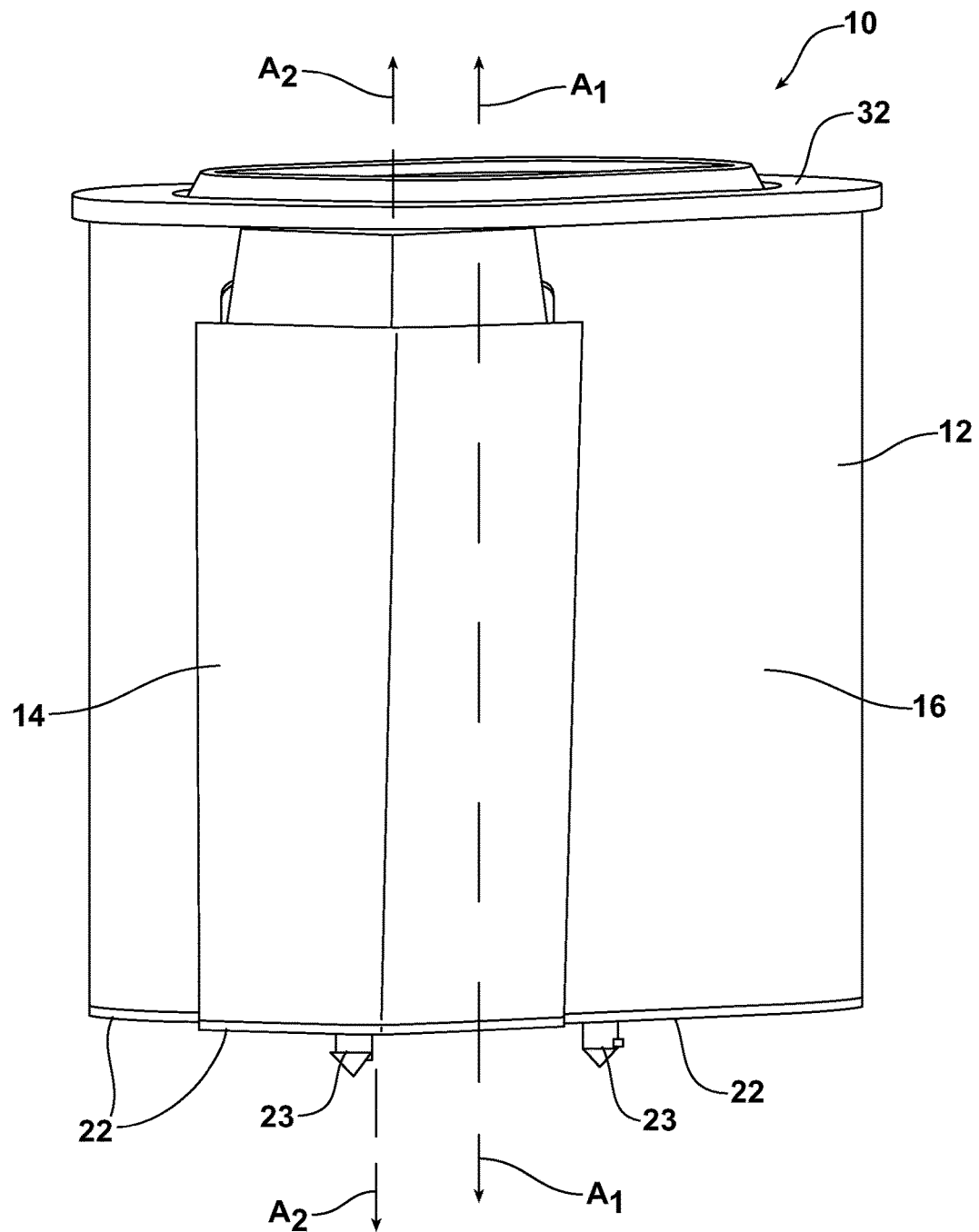
FIG. 1 is a side elevational view of the filter element assembly showing both the primary filter and the auxiliary filter.
Figure 2:
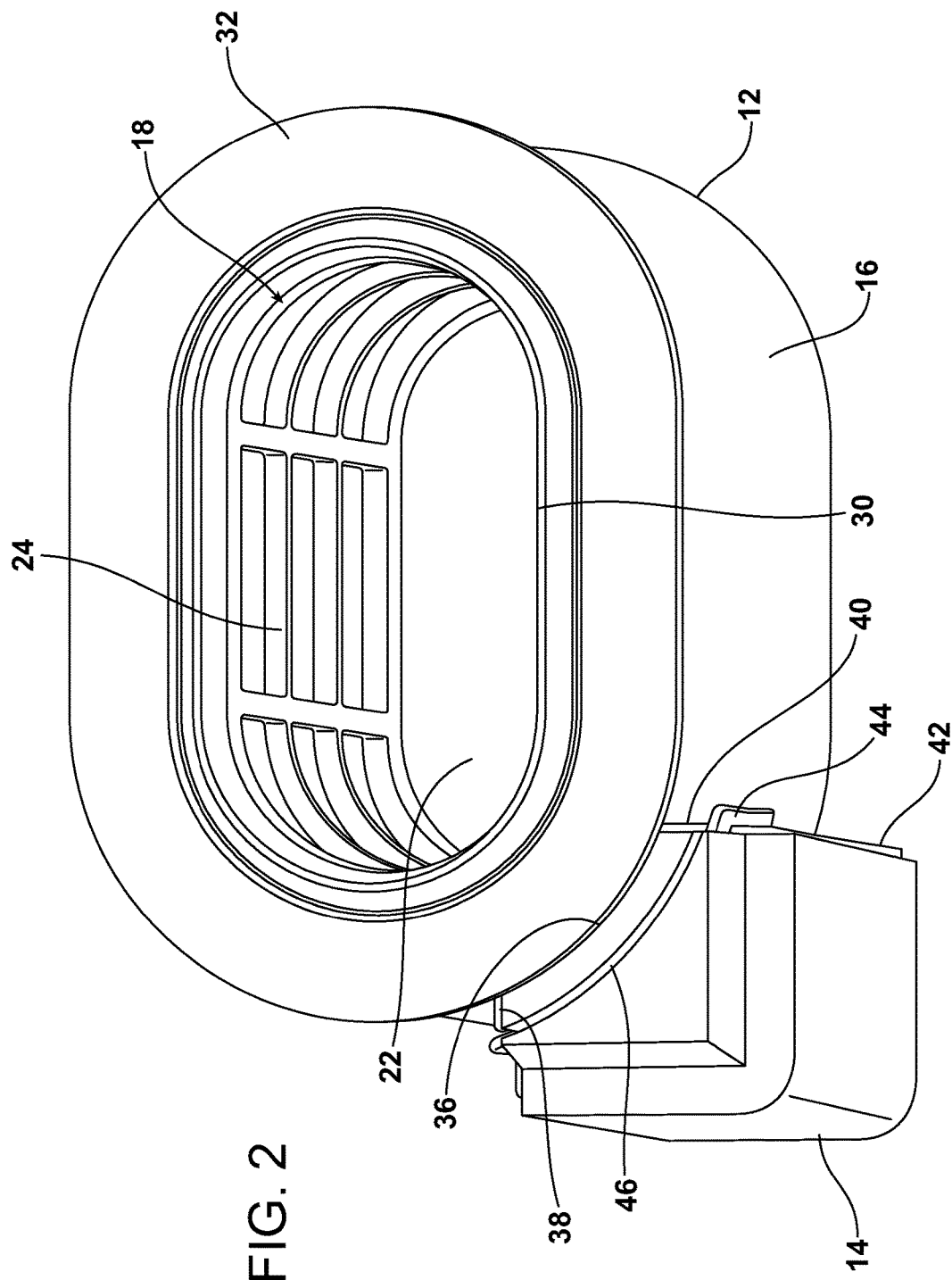
FIG. 2 is a perspective view of the filter element assembly looking downwardly into the core through the axial outlet and showing the support.

Reference is now made to FIGS. 1 and 2 illustrating the filter element assembly 10 which includes a filter body 12 and an auxiliary filter 14. As illustrated in FIGS. 1 and 2, the filter body 12 has a first longitudinal axis $A_1$ while the auxiliary filter 14 has a second longitudinal axis $A_2$. In the illustrated embodiment the first longitudinal axis $A_1$ is parallel to and offset from the second longitudinal axis $A_2$. The filter body 12 comprises a sidewall 16 and a hollow core 18. In the illustrated embodiment, the sidewall 16 is formed by a pleat-pack of pleated filter media of a type known in the art.

Figure 3:
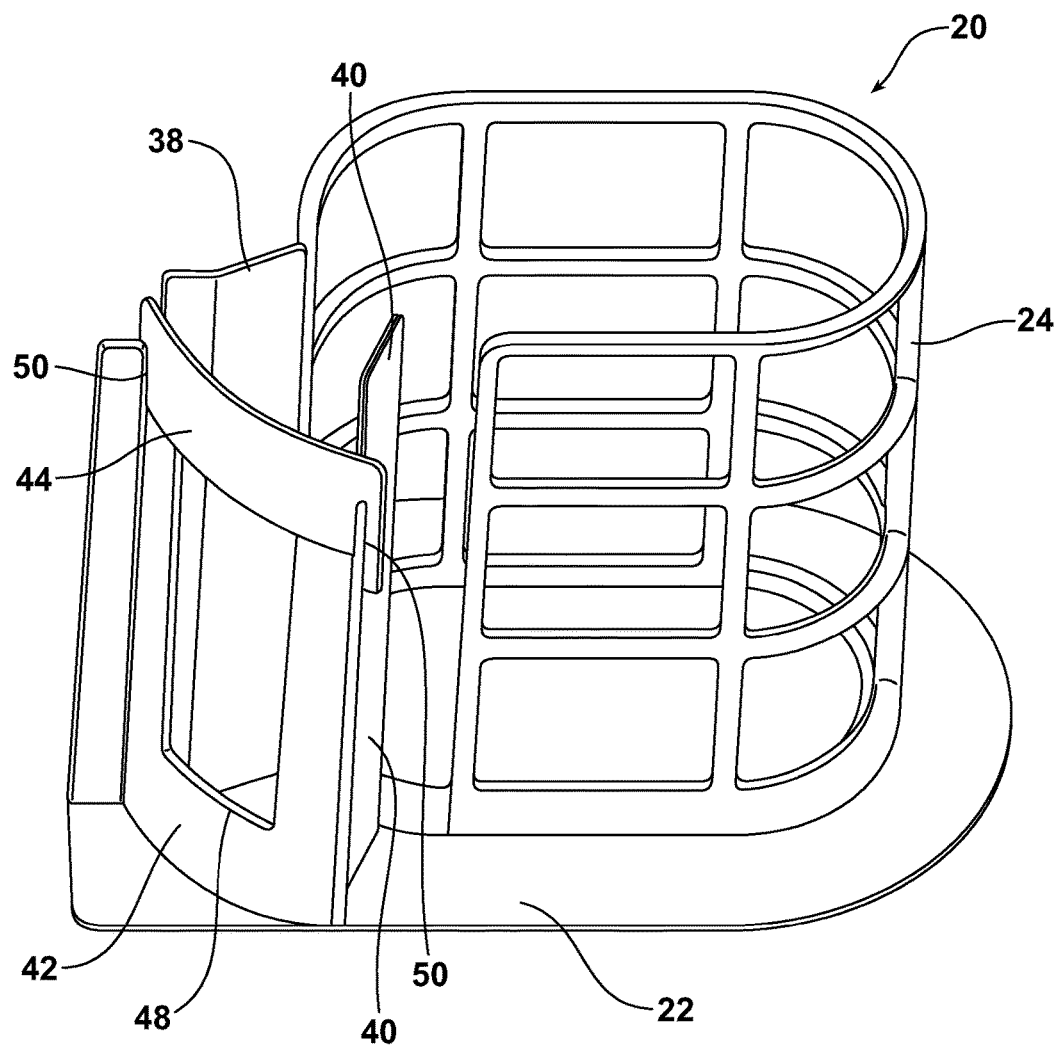
FIG. 3 is a perspective view of the support.

As should be appreciated, both the filter body 12 and auxiliary filter 14 are received and held on a support 20. As best illustrated in FIG. 3, support 20 includes a base 22 and a cage 24 which both may be integrally molded as one or created as separate parts secured together. The filter body 12 is received on the base 22 around the cage 24 so that the cage projects into the hollow core 18 (see FIG. 2). An adhesive may be used to secure the filter body 12 to the base 22. The cage 24 supports the filter 12 and prevents it from collapsing inwardly as air is drawn through the filter body 12 by the motor of the vehicle. Stab pins 23 projecting from the bottom of the base 22 allow for mounting of the filter element assembly 10 in the air cleaner box 60 (see also FIGS. 4 and 5). More specifically, the stab pins 23 are aligned with and received in the projections 68.

As should be further appreciated, the base 22 closes a first end of the core 18. In contrast, the second end of the core 18 remains open, forming an axial outlet 30 as will be described in greater detail below. A pleat sealing ring 32 of polyurethane or other appropriate material engages the end of the sidewall 16 and extends around the axial outlet 30. In the illustrated embodiment, the filter body 12 is oval in cross-section and forms an elliptic cylinder.

The auxiliary filter 14 is formed from an open cell foam filtering material such as a polyester foam or a reticulated open cell polyether foam. The foam of the auxiliary filter 14 provides a more restricted airflow than the filter media of the filter body 12. In one possible embodiment the foam provides approximately in excess of two inches of mercury restriction.

As should be appreciated, the inner face 36 of the auxiliary filter 14 is arcuate and includes a radius of curvature substantially matching the radius of curvature of the outer wall of the filter body 12. Accordingly, the auxiliary filter 14 may be carried against the filter body 12 outside the core 18. As further shown in FIG. 3, the support 20 includes two partitions 38, 40, an auxiliary filter mount in the form of a curved, u-shaped wall 42 and a curved strip fastener 44. In an alternative embodiment not shown, the fastener 44 may be straight. The auxiliary filter 14 includes a mounting groove 46 (see FIG. 2). The auxiliary filter 14 is positioned over the u-shaped wall 42 so that the wall is received in the groove 46 and the filter extends through the opening 48 in the wall. The fastener 44 is then inserted into the top of the groove 46 and the cooperating slots 50 in the partitions 38, 40 to complete the connection and hold the auxiliary filter 14 in position on the support against the filter body 12. This facilitates assembly of the auxiliary filter foam 14 to the support 20.

Figure 4:
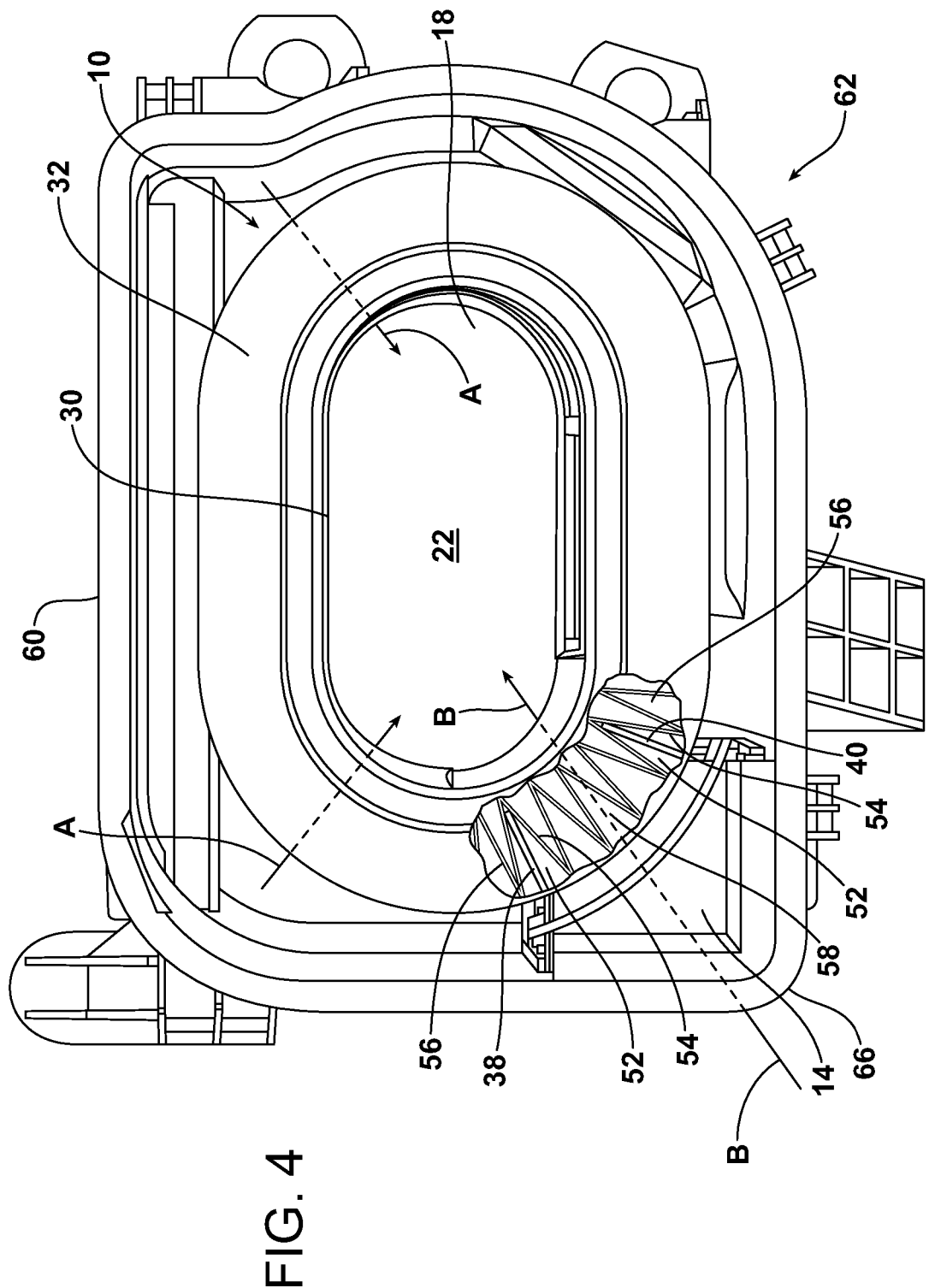
FIG. 4 is a top plan and partially broken-away view illustrating the filter element assembly of FIGS. 1 and 2 positioned in the air cleaner box of the air cleaner assembly of a motor vehicle and showing how the partitions divide the filter body into two sections.

As best illustrated in FIG. 4, the partitions 38, 40 are received in valleys 52 between pleats 54 of the pleat-pack filter body 12. The partitions 38, 40 extend uninterrupted from the base 22 to the sealing ring 32 and effectively function to divide the filter body 12 into a first section 56 that functions as a primary filter and a second section 58 downstream from the auxiliary filter 14. As will be explained in greater detail below, during normal operation, air is drawn into the engine through the first section 56 of the filter body 12 (note action arrows A in FIG. 4). The greater resistance to air flow of the auxiliary filter 14 and the partitions 38, 40 substantially prevent any air flow through the second section 58. However, should the first section 56 become sufficiently clogged so that the air flow resistance of the first section rises above that of the auxiliary filter 14, air will be drawn through the auxiliary filter and the second section 58 (note action arrow B).

Figure 6:
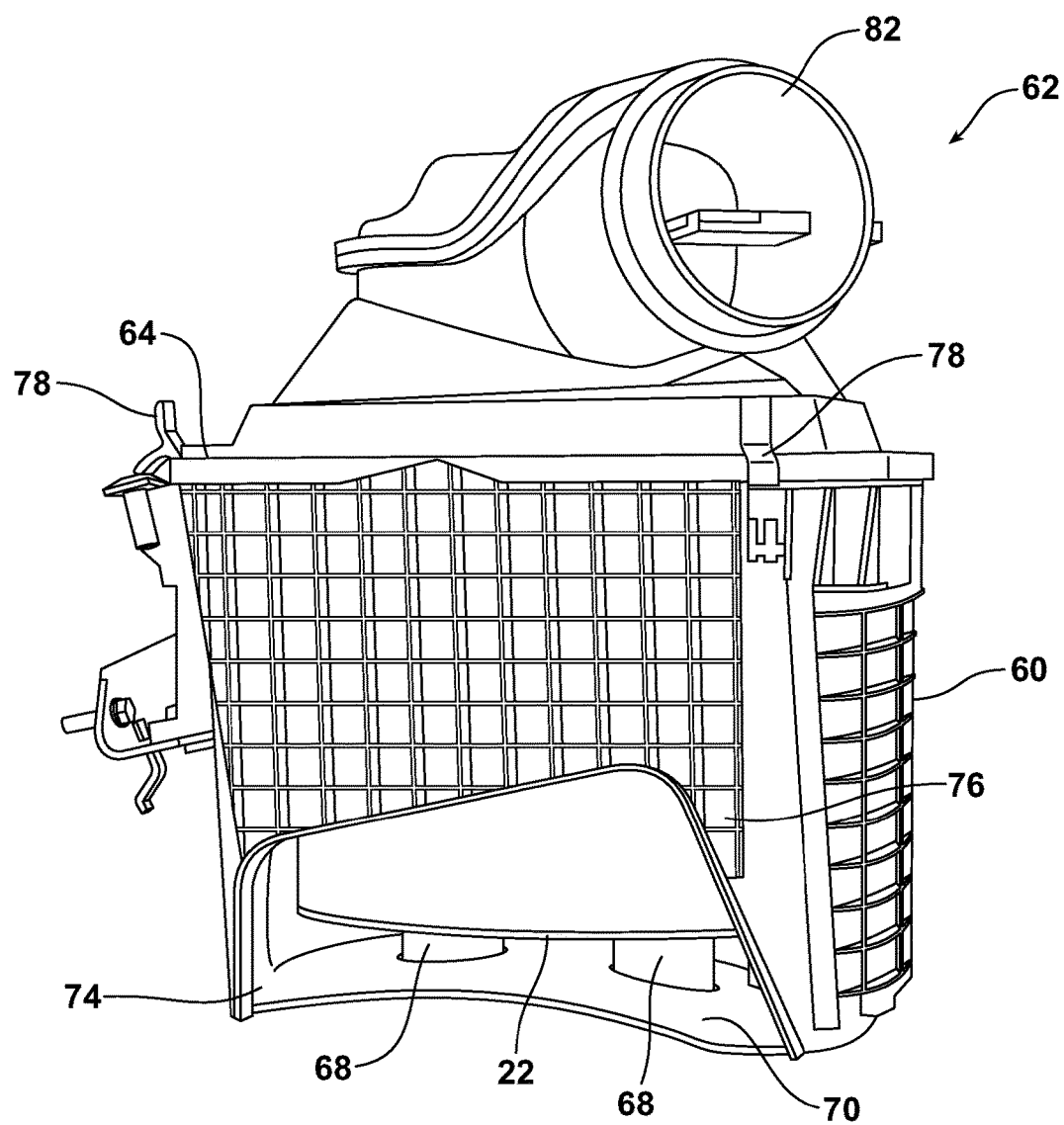
FIG. 6 is a detailed side elevational view illustrating the inlet duct opening in the side of the air cleaner box.

FIG. 4 also illustrates the positioning of the filter element assembly 10 in the air cleaner box 60 of a vehicle air cleaner assembly generally designated by reference numeral 62. More specifically, FIG. 4 illustrates the air cleaner box 60 with the lid 64 removed. As should be appreciated, the filter element assembly 10 may be easily installed within the air cleaner box 60. More specifically, the filter element assembly 10 inclusive of the integrated filter body 12 and auxiliary filter 14 is simply inserted into the air cleaner box 60 with the auxiliary filter 14 oriented into the corner 66 of matching shape so that the outer face of the auxiliary filter 14 fits flush or with designed interference in the corner. As illustrated in FIG. 6, when fully seated in position, the base 22 of the support 20 rests on the projections 68 extending upwardly from the bottom wall 70 of the air cleaner box so as to provide an air passageway between the base and the bottom wall.

Figure 5:
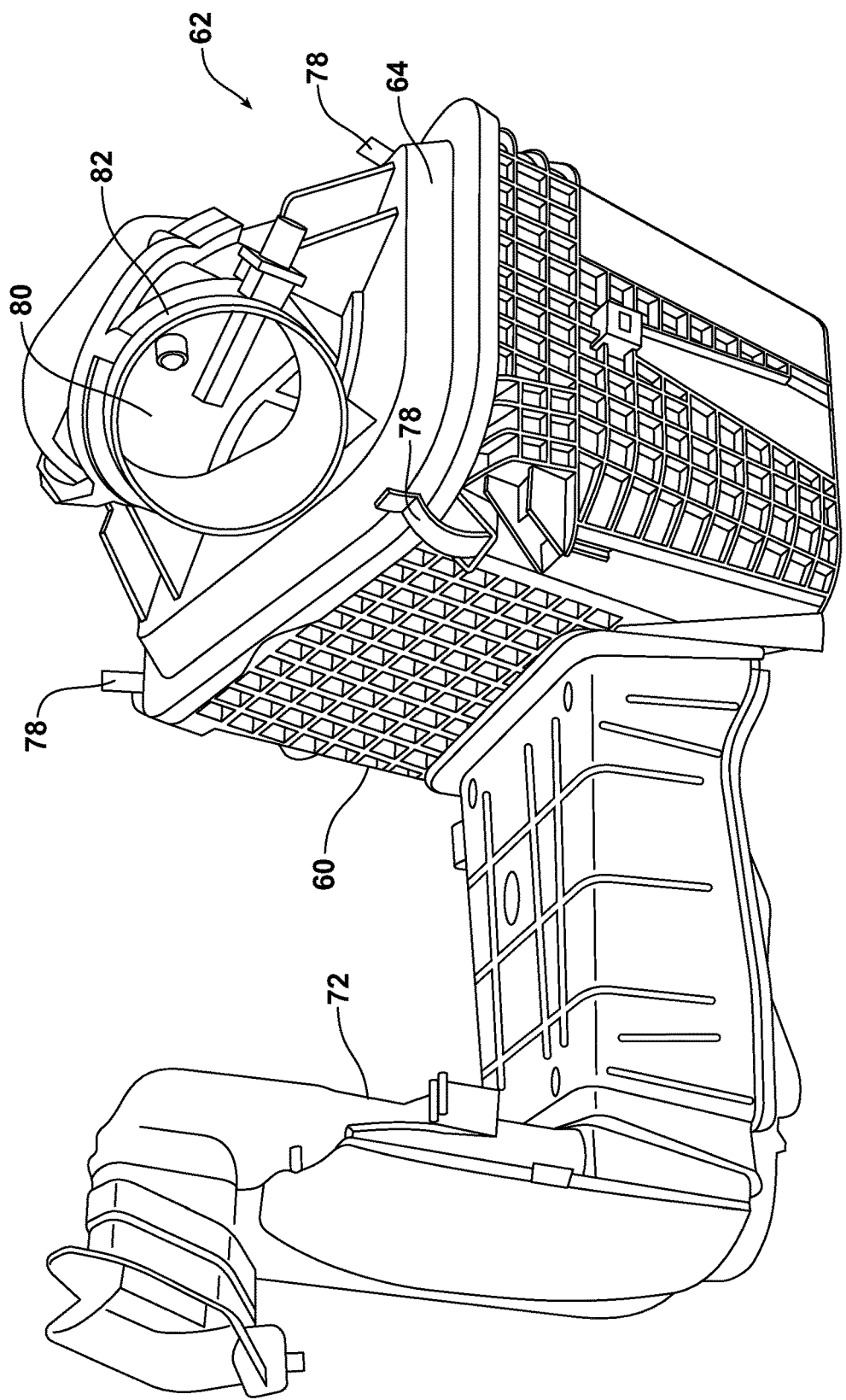
FIG. 5 is a perspective view of the air cleaner assembly illustrating in the inlet duct leading to and the outlet duct leading from the air cleaner box.
Figure 7:
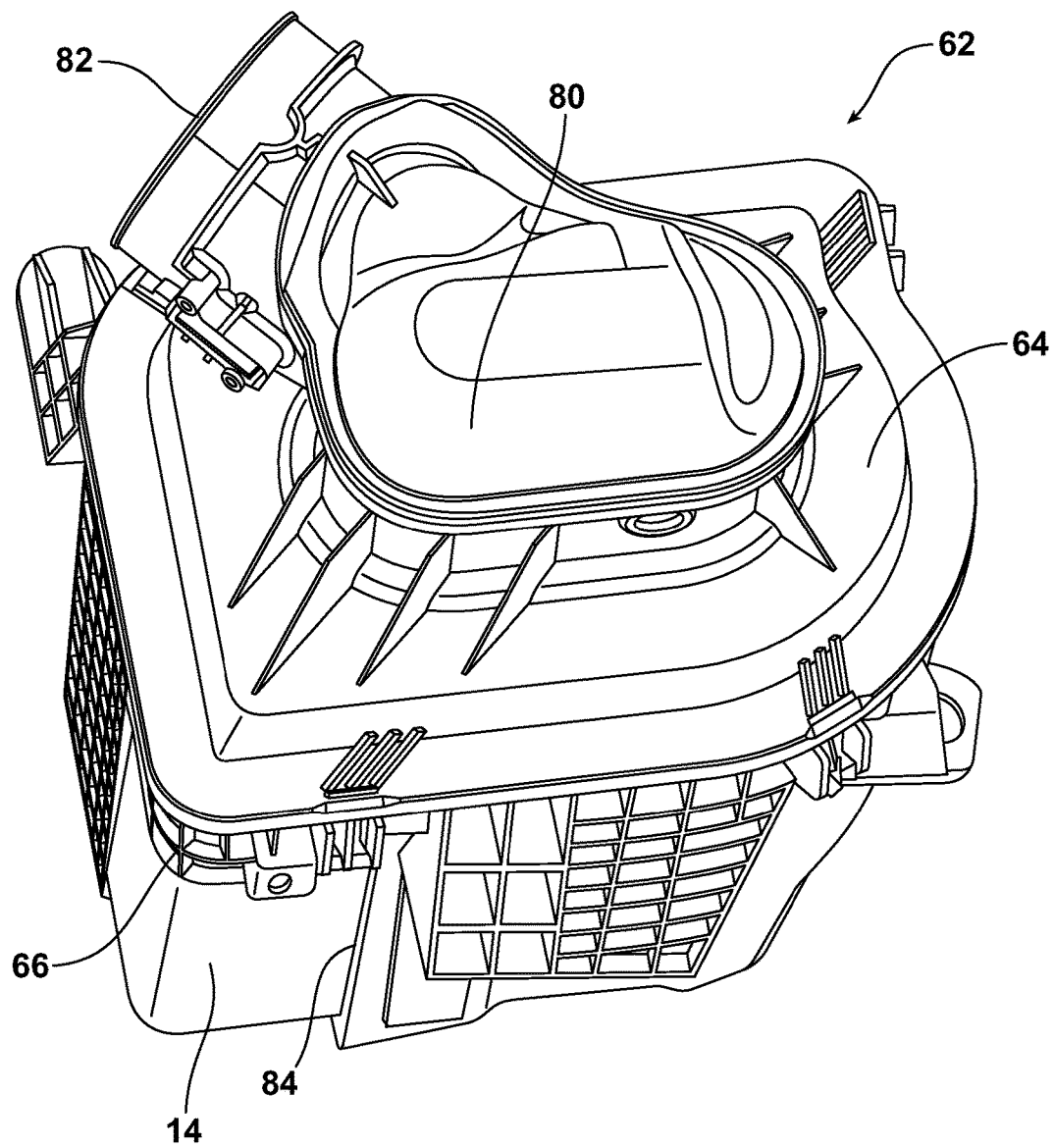
FIG. 7 is a top plan view illustrating the lid closes the top of the air cleaner box and incorporates an outlet plenum and the outlet duct.

As illustrated in FIGS. 5-7, the air cleaner assembly 62 also includes an inlet duct 72 for directing air into the air cleaner box 60 through the opening 74 in the bottom wall 70 and sidewall 76 thereof. Further, the filter element assembly 62 includes the lid 64 that closes the top of the air cleaner box 60 after the filter element assembly 10 has been seated therein. The clips 78 hold the lid 64 in position. As should be further appreciated, the lid 64 includes an outlet plenum 80 and an outlet duct 82. As should be appreciated, the outlet plenum 80 is formed in the lid 64 with an oval shaped opening that is aligned with and matches the axial outlet 30 of the filter element assembly 10. When properly seated and fixed in position by the clips 78, the lid 64 provides a radial and/or axial seal that extends around the axial outlet 30 thereby providing a sealed pathway from the core 18 of the filter element assembly 10 through the outlet plenum 80 to the outlet duct 82.

During normal engine operation, air is drawn into the engine through the inlet duct 72 and the opening 74 into the air cleaner box 60. Air is then drawn through the first section 56 of the filter body 12 which captures dust and particulates. The clean air drawn into the core 18 then passes through the axial outlet 30 into the outlet plenum 80 and then from the outlet duct 82 to the engine of the vehicle. It should be appreciated that during normal operation, the air passes substantially exclusively through first section 56 of the filter body 12 which has far less resistance to airflow than the open cell foam of the auxiliary filter 14. As a result, the second section 58 of the filter body 12 remains clean and clear of any particulates or other material which might degrade its performance.

In the event airflow through the primary filter 12 becomes more restricted than the auxiliary filter 14 such as due to ingestion of ice or snow during inclement weather conditions, air will automatically be drawn from the engine compartment of the vehicle through the auxiliary filter by way of the opening 84 in the side wall of the air cleaner box 60 at the corner 66 (see FIG. 7). As should be appreciated, air in the engine compartment has been warmed by the engine. Accordingly, the auxiliary filter 14 and the second section 58 of the filter body 12 downstream thereof remain free and clear of snow and ice particles. Thus, the airstream being drawn through the auxiliary filter 14 remains available even in inclement weather conditions. That airstream passes from the auxiliary filter 14, to the second filter body section 58 between, the partitions 38, 40 and then through the core 18, the axial outlet 30, the outlet plenum 80 and the outlet duct 82 to the engine. Thus, the engine receives the necessary air to remain running until the vehicle reaches a service area.

Reference is now made to FIGS. 8 and 9 which illustrate yet another embodiment of the filter element assembly 10' which includes a filter body 12' and an auxiliary filter 14'. The filter body 12' comprises a sidewall 16' and a hollow core 18'. In the illustrated embodiment, the sidewall 16' is formed by a pleat-pack of pleated filter material of a type known in the art.

As shown, both the filter body 12' and the auxiliary filter 14' are held on a support 20'. The support 20' may be molded from plastic or made from another appropriate material. An appropriate adhesive may be used to secure the filter body 12' to the support 20'. In one possible embodiment, the support 20' includes mounting cups 23' which are received over projections 68 in the bottom of the air cleaner box 60 when the air filter assembly 10' is secured in the air cleaner box.

As should be further appreciated, the support 20' closes a first end of the core 18'. In contrast, the second end of the core 18' remains open, forming an axial outlet 30'. A pleat sealing ring 32' of polyurethane or other appropriate material engages the end of the sidewall 16' and extends around the axial outlet 30'. In the illustrated embodiment, the filter body 12' is oval in cross-section and forms an elliptic cylinder.

The auxiliary filter 14' is formed from an open cell foam filtering material such as a polyester foam or a reticulated open cell polyether foam. The foam of the auxiliary filter 14' provides a more restricted airflow than the filter media of the filter body 12'. In one possible embodiment the foam provides approximately in excess of two inches of mercury restriction.

As should be appreciated, the inner face 36' of the auxiliary filter 14' is arcuate and includes a radius of curvature substantially matching the radius of curvature of the outer wall of the filter body 12'. Accordingly, the auxiliary filter 14' may be carried against the filter body 12' outside the core 18'. In one possible embodiment, the bottom wall 37' of the auxiliary filter 14' is secured by an adhesive to the lug 39' of the support 20' and the inner face 36' is secured by an adhesive to the filter body 12.'

As illustrated in FIG. 9, the adhesive 41' only needs to be provided as a bead on the peaks 43' of the two pleats which engage the auxiliary filter 14' in order to secure the auxiliary filter in place. In the illustrated embodiment, the two pleats are the two outermost pleats 43' in engagement with the inner face 36'. This limited use of adhesive helps to insure good airflow through the auxiliary filter 14' into the main filter body 12' at those times when the main filter body is clogged.

In summary, the filter element assembly 10 or 10' provides a number of benefits. More specifically, the filter element assembly 10 or 10' includes an integrated filter body 12 or 12' and an auxiliary filter 14 or 14' which allows the filter element assembly 10 or 10' to be quickly and easily installed in the air cleaner box 60 of the vehicle filter element assembly 62 even out in the field. The filter element assembly 10 or 10' is also characterized by inexpensive manufacturing costs.

The foregoing has been presented for purposes of illustration and description. It is not intended to be exhaustive or to limit the embodiments to the precise form disclosed. Obvious modifications and variations are possible in light of the above teachings. For example, in one possible embodiment the second section 58 of the filter body 12 is eliminated and an open passageway is provided downstream of the auxiliary filter 14 between the partitions 38, 40. In another possible embodiment, the leading edge of the partitions 38, 40 extending into the pleat valleys 52 may include a soft edge of polyurethane, rubber or other appropriate material so as to be less abrasive as the pleats 54 vibrate during vehicle operation. All such modifications and variations are within the scope of the appended claims when interpreted in accordance with the breadth to which they are fairly, legally and equitably entitled.

What is claimed:

1. An filter element assembly for a motor vehicle comprising:
   a support;
   a filter body carried on said support, said filter body including a sidewall around a hollow core; and
   an auxiliary filter carried directly on said support against said sidewall.

2. The filter element assembly of claim 1, wherein said filter body forms an elliptic cylinder.

3. The filter element assembly of claim 2, wherein a first end of said core is closed by said support and a second end of said core is an axial outlet.

4. The filter element assembly of claim 3, wherein said filter body is a pleat-pack filter.

5. The filter element assembly of claim 4, wherein said auxiliary filter is an open cell foam.

6. The filter element assembly of claim 5, wherein said auxiliary filter is carried on said support outside said core.

7. The filter element assembly of claim 6, wherein said filter body has a first longitudinal axis and said auxiliary filter has a second longitudinal axis wherein said first longitudinal axis is parallel to and offset from said second longitudinal axis.

8. The filter element assembly of claim 7, further including a sealing ring on said filter body around said axial outlet.

9. The filter element assembly of claim 1, wherein a first end of said core is closed by said support and a second end of said core is an axial outlet.

10. The filter element assembly of claim 1, wherein said filter body is a pleat-pack filter.

11. The filter element assembly of claim 1, wherein said auxiliary filter is an open cell foam.

12. The filter element assembly of claim 1, wherein said auxiliary filter is carried on said support outside said core.

13. The filter element assembly of claim 1, wherein said filter body has a first longitudinal axis and said auxiliary filter has a second longitudinal axis wherein said first longitudinal axis is parallel to and offset from said second longitudinal axis.

14. The filter element assembly of claim 1, further including a sealing ring on said filter body around said axial outlet.

15. The filter element assembly of claim 1, including an adhesive for securing said auxiliary filter to said support.

16. The filter assembly of claim 15, including an adhesive for security said auxiliary filter to said sidewall.

17. The filter element assembly of claim 16 wherein said adhesive is provided on peaks of two outermost pleats which engage said auxiliary filter in order to secure said auxiliary filter in place.

18. The filter element assembly of claim 1 wherein said support includes at least one mounting cup.

* * * * *